(12) United States Patent
Atkinson et al.

(10) Patent No.: US 6,305,420 B1
(45) Date of Patent: Oct. 23, 2001

(54) HEAD GASKET WITH A CHECK VALVE

(75) Inventors: Alan William Atkinson, Nr Rugby; Melanie Jayne Walsh, Nr Daventry, both of (GB)

(73) Assignee: Federal-Mogul Technology Limited, Rugby (GB)

( * ) Notice: Subject to any disclaimer, the term of this patent is extended or adjusted under 35 U.S.C. 154(b) by 0 days.

(21) Appl. No.: 09/424,674

(22) PCT Filed: Jul. 10, 1998

(86) PCT No.: PCT/GB98/02030

§ 371 Date: Nov. 29, 1999

§ 102(e) Date: Nov. 29, 1999

(87) PCT Pub. No.: WO99/05398

PCT Pub. Date: Feb. 4, 1999

(30) Foreign Application Priority Data

Jul. 22, 1997 (GB) .................................................. 9715291

(51) Int. Cl.[7] ............................. F16K 15/14; F01M 1/16; F02F 11/00; F16J 15/10
(52) U.S. Cl. ................... 137/846; 137/533; 137/533.11; 123/196 R; 123/196 S; 184/18; 277/591
(58) Field of Search ...................... 123/196 R, 196 S; 137/533, 533.11, 533.13, 533.15, 533.17, 533.19, 846; 184/18; 277/591

(56) References Cited

U.S. PATENT DOCUMENTS

| 3,118,468 | * | 1/1964 | Bochan ................................. 137/846 |
| 3,509,907 | | 5/1970 | Gannaway ........................... 137/512 |
| 3,648,729 | * | 3/1972 | Balkany ........................... 137/533.13 |
| 4,776,776 | * | 10/1988 | Jones ................................. 137/512.4 |
| 4,944,265 | | 7/1990 | Davey ............................... 123/196 R |
| 5,022,662 | | 6/1991 | Yasui ............................... 277/235 B |

FOREIGN PATENT DOCUMENTS 0 503 635    9/1992 (EP) .............................. F01M/1/02

OTHER PUBLICATIONS

Patent Abstracts of Japan, vol. 017, No. 144 (M–1386), Mar. 23, 1993 & JP 04 318212A (Honda Motor Co. Ltd), Nov. 9, 1992 (see abstract; figure).

* cited by examiner

*Primary Examiner*—John Rivell
*Assistant Examiner*—Ramesh Krishnamurthy
(74) *Attorney, Agent, or Firm*—Synnestvedt & Lechner I

(57) ABSTRACT

A head gasket which acts, when clamped between a head and a cylinder block of an internal combustion engine, to form a seal around at least one lubricant or hydraulic fluid passage which extends between the head and the block. The gasket also comprises a non-return valve which extends across said passage and allows flow of liquid in said passage towards the head but prevents flow of liquid in said passage towards the block.

6 Claims, 3 Drawing Sheets

HEAD GASKET WITH A CHECK VALVE

This invention is concerned with gaskets, in particular head gaskets of internal combustion engines.

Head gaskets act, when clamped between the head and the block of an engine, to form seals around the cylinders of the engine and also around lubricant and coolant passages which extend between the head and the block. Conventionally, head gaskets perform no more than a sealing function but it has been proposed (see U.S. Pat. No. 5,022,662) that such a gasket should incorporate a thermostatically-operated valve mounted in one of the coolant passages to control flow of coolant in dependence on local temperature conditions.

Internal combustion engines often suffer from poor lubrication in the period immediately after the engine has been started. This is due to the lubricant draining to the sump while the engine is stopped and the time delay before lubricant is pumped by the operation of the engine into the upper parts of the engine. The lack of lubricant on starting of the engine can lead to metal-to-metal contact with consequential damage. A related problem can arise in engines which utilize hydraulic tappets in that the oil drains out of the line which feeds the tappet during a period when the engine is stopped. This leads to the tappets being deficient in oil on start-up so that, for a few seconds, the tappets are unable to maintain a small enough clearance with the cam etc. This results in a short period of unacceptable noise, known as "tappet rattle".

It is an object of the present invention to provide a gasket which enables the lubrication of an internal combustion engine to be improved in the period immediately after the engine has been started, and/or, where hydraulic tappets are used, enables the problem of tappet rattle to be prevented or reduced.

The invention provides a head gasket which acts, when clamped between a head and a cylinder block of an internal combustion engine, to form a seal around at least one lubricant or hydraulic fluid passage which extends between the head and the block, characterized in that the gasket also comprises a non-return valve which extends across said passage and allows flow of liquid in said passage towards the head but prevents flow of liquid in said passage towards the block.

In a gasket according to the invention, the non-return valve can act to prevent lubricant from draining out of the head through said passage or can act to prevent hydraulic fluid from draining away from a hydraulic tappet. Accordingly, liquid lubricant or hydraulic fluid is retained on top of the valve while the engine is stopped so that it is available in the head as soon as the engine is started. Clearly, a gasket according to the invention may have a plurality of non-return valves in a plurality of passages to thereby make more liquid available on starting of the engine.

In a gasket according to the invention, the non-return valve make take any suitable form. For example, in one form which is preferred for its simplicity, the valve comprises a nozzle formed from resilient material, the nozzle being designed to be closed by fluid pressure acting towards the block but to be opened by fluid pressure acting towards the head. Conveniently, the nozzle is formed integrally with sealing means of the gasket, ie either with a sheet of resilient material, eg silicone rubber, extending across the area of the gasket, or with a gasket bead, eg of silicone rubber, adhered to a core sheet of the gasket and extending around a closed path around the passage.

In another preferred form of a gasket according to the invention, the non-return valve is a ball or a movable disc valve. Such a valve, conveniently, comprises a cage which is formed integrally with sealing means of the gasket, ie with a resilient sheet or bead as referred to in the last preceding paragraph. The cage retains the ball or disc but allows it to move between sealing and open positions.

It is also possible for the non-return valve to comprise a resilient disc mounted on top of a sheet of the gasket and covering a hole therethrough, the disc being deformable by fluid pressure to allow passage of liquid.

There now follow detailed descriptions, to be read with reference to the accompanying drawings, of three gaskets which are illustrative of the invention.

Figure 1:
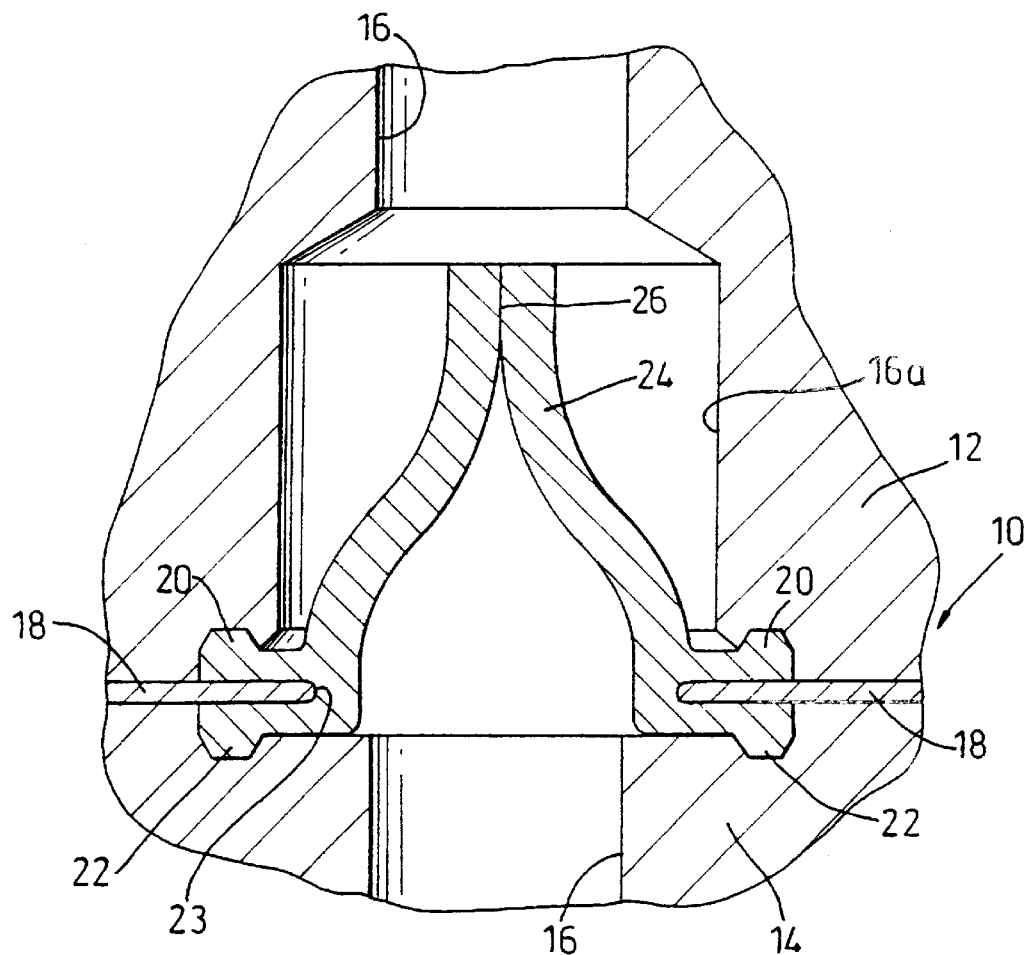
FIG. 1 is a diagrammatic enlarged cross-sectional view of the first illustrative gasket.

The first illustrative gasket 10 is a head gasket which acts, when clamped between a head 12 and a cylinder block 14 of an internal combustion engine, to form a seal around a lubricant passage 16 which extends between the head 12 and the block 14. The passage 16 is generally cylindrical but has an enlarged portion 16a opening into the lower surface of the head 12.

The gasket 10 comprises a sheet metal core 18 and two beads 20 and 22 of resilient material, specifically silicone rubber. The bead 20 is adhered to the upper surface of the core 16 so that it is between the core 18 and the head 12 and acts as sealing means therebetween. The bead 22 is adhered to the lower surface of the core 18 so that it is between the core 18 and the block 14 and acts as sealing means therebetween. The core 18 has a hole 23 therethrough which corresponds the passage 16, the hole 23 being smaller in diameter than the portion 16a of the passage 16 but greater in diameter than the remainder of the passage 16. The beads 20 and 22 extend along closed paths around the hole 23 so that they can form seals around the passage 16.

The gasket 10 also comprises a non-return valve 24 which extends across said lubricant passage 16 and allows flow of lubricant in said passage towards the head 12 but prevents flow of lubricant in said passage towards the block 14. The non-return valve 24 is formed as a nozzle formed from resilient material, specifically the nozzle is formed from silicone rubber integrally with the beads 20 and 22. The nozzle 24 (see also FIG. 2) has a hollow cylindrical base at the level of the core 18 and extends upwardly within the enlarged portion 16a of the passage 16. The nozzle 24 has an elongated slit-like opening 26 at its upper end which is defined between opposite side walls of the nozzle which slope inwardly to engage one another below the opening 26 and then project upwardly to the opening 26 in contact with one another. Thus, the valve 24 is designed to be closed by its inherent resilience and by fluid pressure acting towards the block 14, since the pressure acting on top of the nozzle presses the sides of the opening 26 together. Also, the valve 24 is designed to be opened, against its inherent resilience, by fluid pressure acting towards the head 12, since the pressure within the nozzle forces the sides of the opening 26 apart.

When the engine of which the head 12 and the block 14 form part is stopped, lubricant in the head 12 cannot drain down the passage 16 past the valve 24 but, instead, is retained in the head 12 resting on the valve 24.

Figure 2:
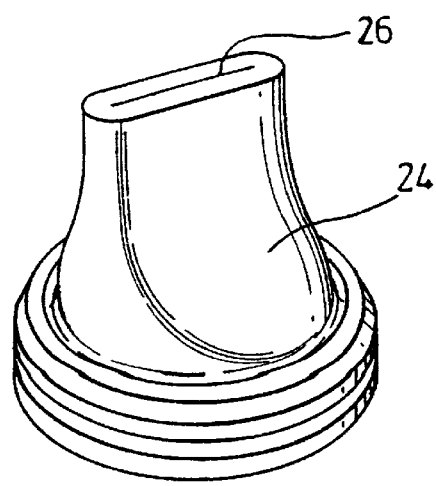
FIG. 2 is a diagrammatic perspective view, on a smaller scale than FIG. 1 of a non-return valve of the first illustrative gasket.

In modifications of the first illustrative gasket, the non-return valve 24 may have a different shape to that shown in FIGS. 1 and 2. For example, in order to increase the flow area of the valve, the slit in the valve may be cross-shaped or have a wave-like form.

Figure 3:
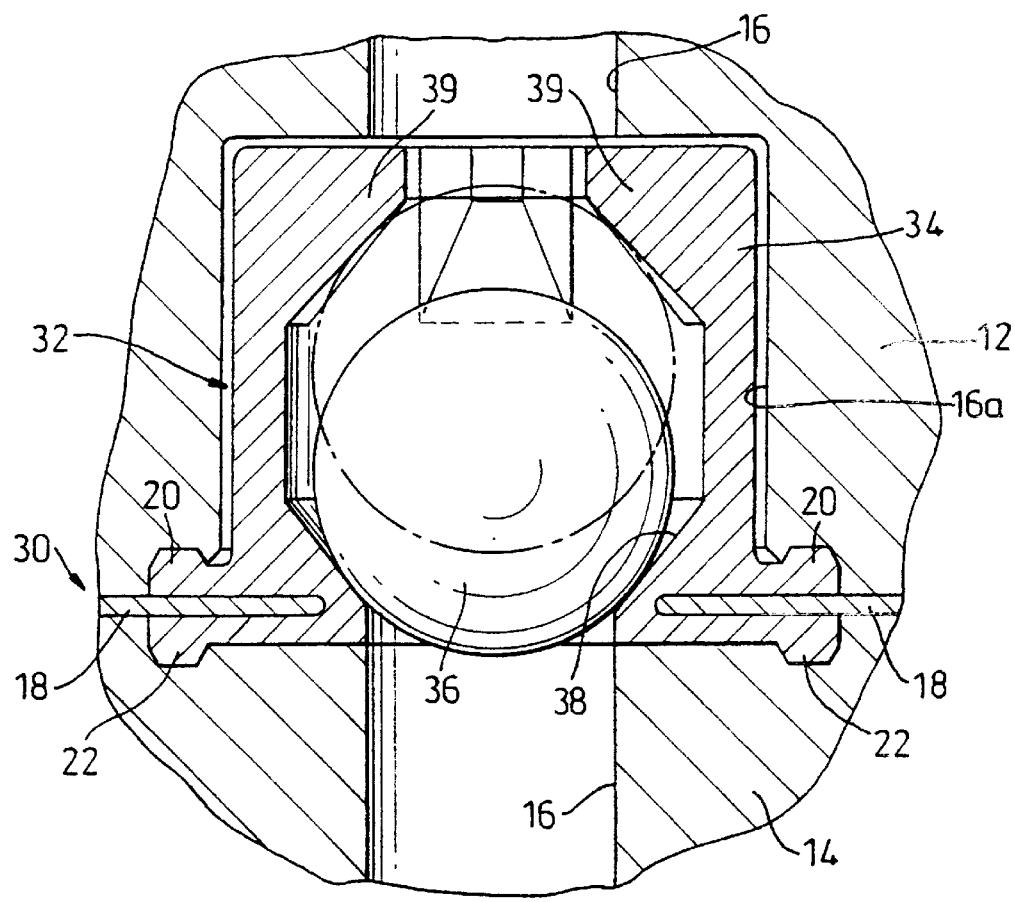
FIG. 3 is a view similar to FIG. 1 but of the second illustrative gasket.

The second illustrative gasket 30 is shown in FIG. 3. The gasket 30 is similar to the gasket 10 except in the form of its non-return valve so that like reference numerals are used herein for like parts of the gaskets 10 and 30. The gasket 30 is used between a head 12 and a block 14 and seals around a lubricant passage 16 which has an enlarged portion 16a in the head 12.

The gasket 30 comprises a core 18 and beads 20 and 22. The gasket 30 also comprises a non-return valve 32 which extends across said lubricant passage 16 and allows flow of lubricant in said passage towards the head 12 but prevents flow of lubricant in said passage towards the block 14. The valve 32 is in the form of a ball valve comprising a cage 34 and a ball 36 retained in the cage 34. The cage 34 is contained in the enlarged portion 16a of the passage 16 and is formed from silicone rubber integrally with the beads 20 and 22. At its lower end, the cage 34 defines a frusto-conical seat 38 against which the ball 36 can seal (this position of the ball 36 being shown in solid line in FIG. 3). Above the seat 38, the cage 34 extends upwardly as a hollow cylinder enclosing the ball 36. At its upper end, the cage 34 has four inwards projections 39 (see also FIG. 4) which act to retain the ball 36 in the cage 34 and to prevent the ball 36 from sealing the passage 16 at the step at the upper end of the enlarged portion 16a. The projections 39 have gaps between them which cannot be sealed by the ball 36.

Figure 4:
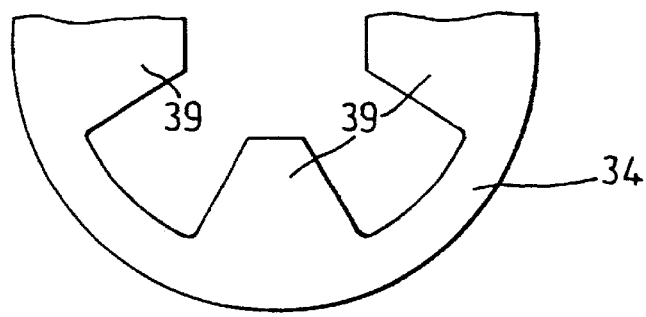
FIG. 4 is a partial plan view of a non-return valve of the second illustrative gasket.

Thus, the valve 32 is designed to be closed by fluid pressure acting towards the block 14, since the pressure acting on top of the ball 36 presses it against the seat 36, but to be opened by fluid pressure acting towards the head 12, since the pressure moves the ball 36 upwardly into engagement with the projections 39 (this position of the ball 36 being shown in broken line in FIG. 4).

When the engine of which the head 12 and the block 14 form part is stopped, lubricant in the head 12 cannot drain down the passage 16 past the valve 32 but, instead, is retained in the head 12 resting on the ball 36.

Figure 5:
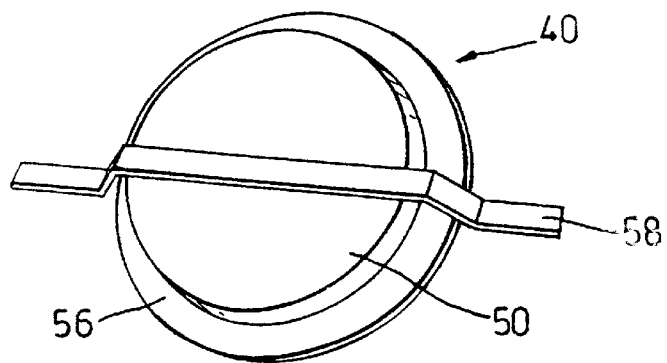
FIG. 5 is a perspective view of a non-return valve of the third illustrative gasket.
Figure 6:
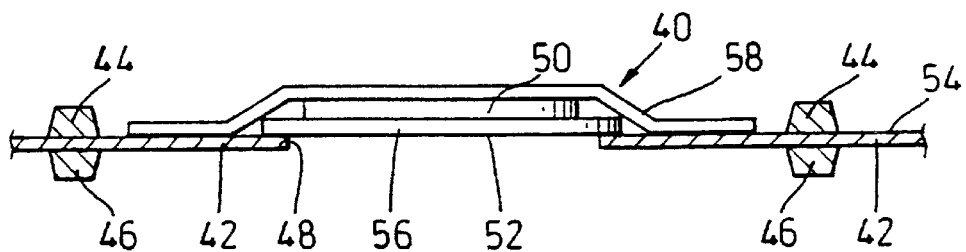
FIG. 6 is a side view of the valve shown in FIG. 5.
Figure 7:
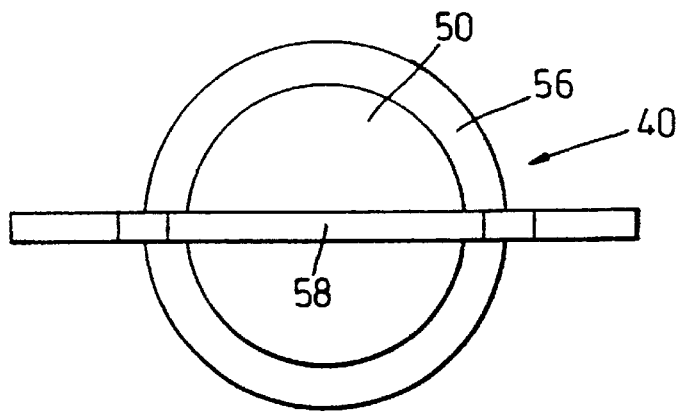
FIG. 7 is a plan view of the valve shown in FIGS. 5 and 6.

FIGS. 5 to 7 illustrate a non-return valve 40 of a third illustrative gasket which comprises a core sheet 42 and resilient sealing beads 44 and 46 (only shown in FIG. 6). The sheet 42 has a circular hole 48 therein which corresponds to a lubricant passage passing from a block to a head.

The non-return valve 40 comprises a circular resilient disc 50 made of silicone rubber. The disc 50 has a lower flat surface 52 which is positioned on the upper surface of the core sheet 42 and covers the hole 48. Around its periphery, the disc 50 is reduced in thickness to form a flange 56 having its lower surface flush with the lower surface 52 of the disc 50. The flange 56 has a greater outer diameter than the diameter of the hole 48 in the sheet 42 and a smaller inner diameter than the diameter of the hole 48. The disc 50 is mounted on the upper surface 54 of the sheet 42 concentrically of the hole 48 so that the flange 56 of the disc 50 overlaps the edge of the hole 48, ie the disc extends across the lubricant passage. The disc 50 is mounted by means of a metal strip 58 which extends diametrically across the top of the disc 50 and is adhered thereto. The strip 58 has end portions which are cranked downwardly to the level of the upper surface 54 of the sheet 42 and are secured thereto.

In the operation of the valve 40, when fluid pressure is directed downwardly from the head to the block, the flange 56 is pressed into sealing engagement with the edge of the hole 48, ie the valve 40 prevents flow of liquid in the passage towards the block. On the other hand, when fluid pressure is directed upwardly from the block to the head, the pressure deforms the flange 56, bending it upwardly out of engagement with the edge of the hole 48 and allowing passage of liquid upwardly past the disc 50, ie the valve 40 allows flow of liquid in said passage towards the head.

What is claimed is:

1. A head gasket which acts, when clamped between a head and a cylinder block of an internal combustion engine, to form a seal around at least one lubricant or hydraulic fluid passage which extends between the head and the block, wherein the gasket also comprises a non-return valve which is arranged so that, when the gasket is clamped as aforesaid, the valve extends across said passage and allows flow of liquid in said passage towards the head but prevents flow of liquid in said passage towards the block.

2. A gasket according to claim 1, wherein the valve comprises a nozzle formed from resilient material, the nozzle being designed to be closed by fluid pressure acting towards the block but to be opened by fluid pressure acting towards the head.

3. A gasket according to claim 2, wherein the nozzle is formed integrally with sealing means of the gasket which is arranged to form said seal.

4. A gasket according to claim 1, wherein the non-return valve is a ball or a movable disc valve.

5. A gasket according to claim 4, wherein the valve comprises a cage which is formed integrally with sealing means of the gasket which is arranged to form said seal.

6. A gasket according to claim 1, wherein the non-return valve comprises a resilient disc mounted on top of a sheet of the gasket and covering a hole therethrough, the disc being deformable by fluid pressure to allow passage of liquid.

* * * * *